April 8, 1924.
C. A. FOSBERG
1,489,387
DRAG SAW
Filed May 13, 1922
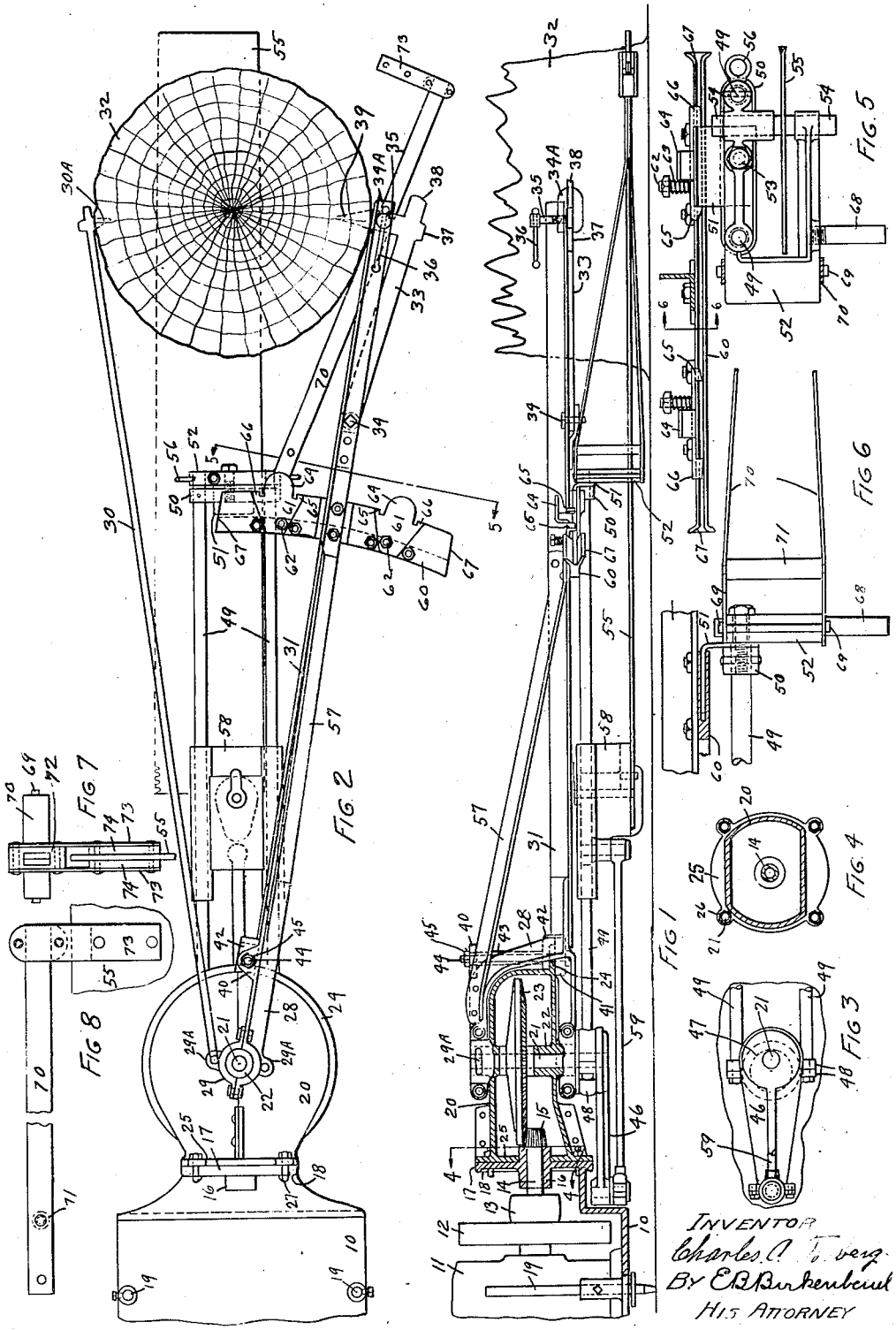

Patented Apr. 8, 1924.

1,489,387

UNITED STATES PATENT OFFICE.

CHARLES A. FOSBERG, OF PORTLAND, OREGON.

DRAG SAW.

Application filed May 13, 1922. Serial No. 560,795.

*To all whom it may concern:*

Be it hereby known that I, CHARLES A. FOSBERG, a citizen of the United States, and a resident of Portland, in the county of Multnomah and State of Oregon, have invented a new and useful Drag Saw, of which the following is a specification.

This invention relates more particularly to drag saws for felling and cutting logs and timbers.

The objects of my invention are to provide an exceedingly simple and efficient drag saw which is easily separated from its power plant.

A second object is to so construct the saw that the weight of the saw blade is not borne by the saw frame alone but by a brace which is secured to the saw frame and to the tree, thereby reducing the strain and friction on the frame.

A third object is to so construct my saw that its blade may be held and locked in various positions.

A fourth object is to provide a means for steadying the tip of the saw blade until it is sufficiently guided by the saw cut which the blade produces.

I accomplish these results in the manner set forth in the following specification and illustrated in the accompanying drawing, in which:

Figure 1 is a front elevation of my saw with the housing and frame partly broken away in section to better show the relation of the parts. Figure 2 is a plan of the saw with the engine removed from its base. Figure 3 is a bottom view of the crank arm and eccentric. Figure 4 is a section along the line 4—4 in Fig. 1. Figure 5 is an enlarged section along the line 5—5 in Fig. 2. Figure 6 is a section along the line 6—6 in Fig. 5. Figure 7 is an end elevation of the saw tip and its steadying means. Figure 8 is a side elevation of Fig. 7.

Similar numbers of reference refer to the same or similar parts throughout the several views.

Referring in detail to the drawing, I have constructed my device of a horizontal base 10 upon which is mounted a suitable motor 11 having a fly wheel 12, a belt pulley 13, and a shaft 14 which has secured on its outer end a bevel pinion 15. The shaft 14 journals in the bearing 16 which is formed in the circular face plate 17 erected at one end of the base 10. A circular rib 18 is formed on the back of the member 17. Adjustable rod legs 19 are attached to the base 10. These may be replaced by casters or wheels for moving purposes, if desired. I have now described the power section of my saw which is a unit in itself and can be employed for furnishing power for other purposes as required.

Referring now to the saw itself, I have constructed a housing 20 which may be split or divided in any convenient manner. A shaft 21 passes through the housing and journals in the bearings 22. A bevel gear 23 is secured on the shaft 21 and meshes with the pinion 15. The circular flange 24 is formed around the housing 20. The circular base 25 of the housing 20 is of the same diameter as is the face plate 17 and has four projecting ears 26 which carry the hook bolts 27 which clamp over the rib 18. It will be seen that the housing 20 with its attached parts can be rotated about the axis of the shaft 14.

An arched frame 28 is hinged on the outer ends of the bearings 22. Split bearings 29 are provided for assembling purposes. Eyes 29^A are formed on the bearings 29 into which may be hooked one end of the brace rod 30 when working on hilly ground. The brace rod 30 is provided with a point or dog 30^A which can be driven into the tree or log being sawed. A brace 31 extends from the frame 28 to the tree 32. A dog 33 is removably hinged by the bolt 34 to the brace 31.

A U-shaped clamp 34^A is mounted on the brace 31 and is provided with a screw 35 which can be turned by the handle 36. After the dog 33 is driven into the tree 32 the screw 35 is clamped down upon the dog 33. This avoids jarring the saw when striking upon the head 37 of the dog 33. The projecting arm 38 is used to withdraw the point 39 from the wood.

On the back of the frame 28 I have formed the lugs 40 and 41. The lug 41 rubs against the under side of the flange 24. A clamping plate 42 rests upon the lug 41 and the flange 24. A pipe spacer 43 rests on the plate 42 and passes through the lug 40. A bolt 44 passes through the spacer 43 and has its head under the lug 41 and its nut 45 on top of the pipe spacer 43. Tightening the nut 45 forces the plate 42 against the flange 24 and locks the frame 28 in relation to the housing 20.

Secured to the shaft 21 is a crank arm 46 on whose hub is formed an eccentric 47 to whose straps 48 are secured the slide rods 49. This eccentric is used to depress the leading end of the saw as is the common practice. The opposite ends of the rods 49 are joined together by a bar 50. To the bar 50 is secured an L-shaped arm 51. An arched saw guide 52 receives the shouldered ends of the rods 49 and is secured to the bar 50 by the bolt 53. The usual wooden guide pins 54 hold the saw blade 55 in its proper plane.

An eye 56 is provided for a rope when required to feed the saw. The diagonal brace 57 unites the frame 28 to the middle of the brace 31. A cross head 58 is slidably mounted on the rods 49 and carries the saw blade 55 and is joined by the connecting rod 59 to the crank arm 46. Attached to the under side of the brace 31 is a curved channel 60 which slidably receives the member 51 and supports the member 52 and its attached parts. The latches 61 are pivoted on bolts 62 on which are placed the springs 63. A handle 64 on each of the latches 61 enables the operator to raise the latch and swing it out of its operative position. Each of the latches 61 is provided with the lugs 65 and 66 whose intervening spaces are equal to the width of the member 51. The lugs 65 are beveled on the sides toward the brace 31 and square on the opposite sides, while the lugs 66 are square on both sides.

The ends 67 of the channel 60 are flared to assist in starting the arms 51 into the channel 60. A handle 68 is threaded into the member 52. A pair of lugs 69 project from the edges of the saw guide 52 and have pivoted thereon the spring arms 70 held together at their hinged end by the bar 71 and united at their swinging ends which fit snugly in the block 72 to whose sides are attached the spring members 73 which are lined with the fiber strip 74 between which the saw blade 55 slides.

The operation of my device is as follows: When felling a tree the saw is set up, as indicated in Figures 1 and 2, and the upper section of the saw solidly placed upon the ground and as level as practicable. The dog point 39 is loosened and driven into the tree and the nut 45 tightened, as well as the screw 35. If the ground is very hilly it is best to hook the rod 30 into the eye 29^A and drive the point 30^A of the dog into the opposite side of the tree. The saw guide, which has been held away from the tree by the latch 61, is now released and the saw permitted to cut into the tree, the engine, of course, having been started previously and the saw caused to reciprocate in the manner common with other saws of this nature.

It will be seen that the guide strips 74 which held the point of the saw as it was beginning its cut are held back by the tree as the saw cuts into the tree, as shown in Fig. 2. When cutting up logs the bolts 27 are loosened and the entire housing rotated until the saw blade is in the desired plane when the bolts are again tightened.

It will be seen that the saw blade 55 can be reversed on the cross head 58 and the brace 31 be placed on the opposite side of the tree. The same applies to the brace 30. In this event the opposite latch 61 is used to hold the saw away from the wood until the machine is properly set.

It is evident that since the saw guide is supported by the channel 60 that the binding action produced by supporting the saw along the axis of the shaft 21 is greatly reduced.

What I claim as new is:

1. A drag saw including a motor frame and a saw guide rotatably supported by said frame, and having means for locking same against rotation, in combination with an adjustable brace hinged to said frame and having a wood engaging dog secured at its outer end, a curved track secured to said brace, an arm attached to said saw guide slidably engaging said track in a manner to support said saw, and a pair of opposed spring latches located near opposite ends of said track each of said latches having a pair of opposed lugs angled on their outer sides and square on their inner sides, which lugs normally lie in the path of said guide arm and which are adapted to raise said latches when their angled faces are pressed against by said guide arm and to confine said arm between their square shoulders.

2. A drag saw including a motor, a frame supporting said motor, a pitman, guides and saw rotatably and removably mounted on said frame, a dog-carrying brace hinged on said frame having means for rendering said brace rigid with said frame, a curved track secured on said brace, an arm secured to said saw guide engaging said track, and a double opposed spring latch near each end of said track the projections of each latch having angled outer faces adapted to admit said guide arm between same and hold said guide arm against movement in either direction until the latch is raised.

3. In a drag saw, the combination of a motor, a base for said motor, a circular wall at the outer end of said base having at its center a bearing for the motor shaft; a rotatable housing mounted against said circular wall, means for locking said housing to said wall, a shaft journaling in said housing transversely with said motor shaft and driven thereby, a circular flange on said housing, a dog-carrying arm hinged on the axis of said transverse shaft, means for locking said arm to said circular flange, a crank driven by said transverse shaft, a saw blade driven by said crank, a saw guide on said saw blade, a track attached to said dog-carrying arm, and an arm attached to said saw guide and riding on said track in a manner to support said saw.

4. In a drag saw, the combination of a dog-carrying brace hinged to a motor frame, a saw guide pivoted on the motor axis, a curved channel secured to said brace, an arm slidably supported by said channel and secured to said saw guide, a double latch secured near each end of said channel, each of said latches consisting of a spring-urged latch rotatably mounted on said channel, each of said latches having inturned projections normally engaging notches in one side of said channel, the outer sides of said projections having angled faces, the inner faces having sufficient spacing to receive said guide arm and hold same until said latch is raised sufficiently to withdraw said projection, said latch being made inoperative by withdrawing same from the notches in the channel and rotating the latch a short distance on its pivot.

5. A drag saw having, in combination, a blade, a guide for the middle of said blade, and a blade tip steadying arm consisting of a pair of flexible strips hinged to said saw guide and converging to form a spring fork adapted to receive the tip of said saw in a manner to guide same and leave said saw as it enters its cut.

CHARLES A. FOSBERG.